United States Patent Office 3,423,816
Patented Jan. 28, 1969

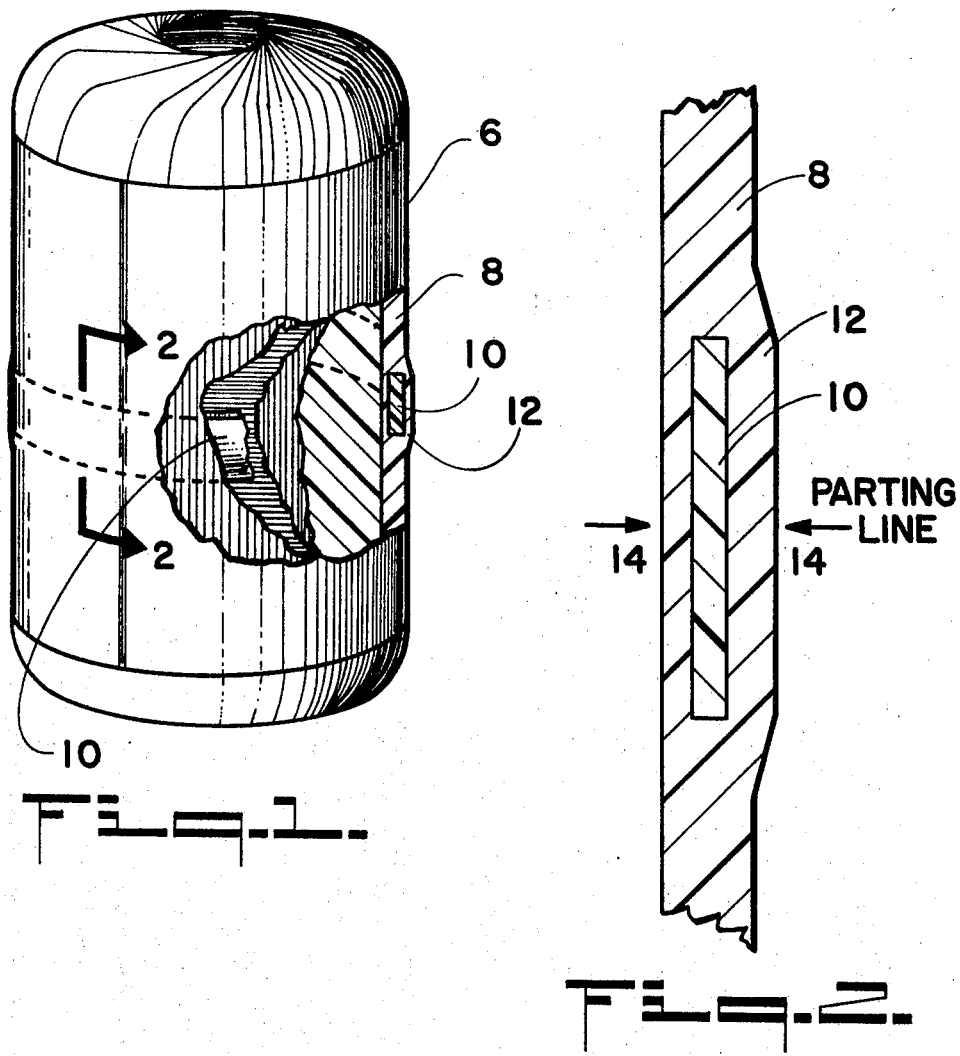

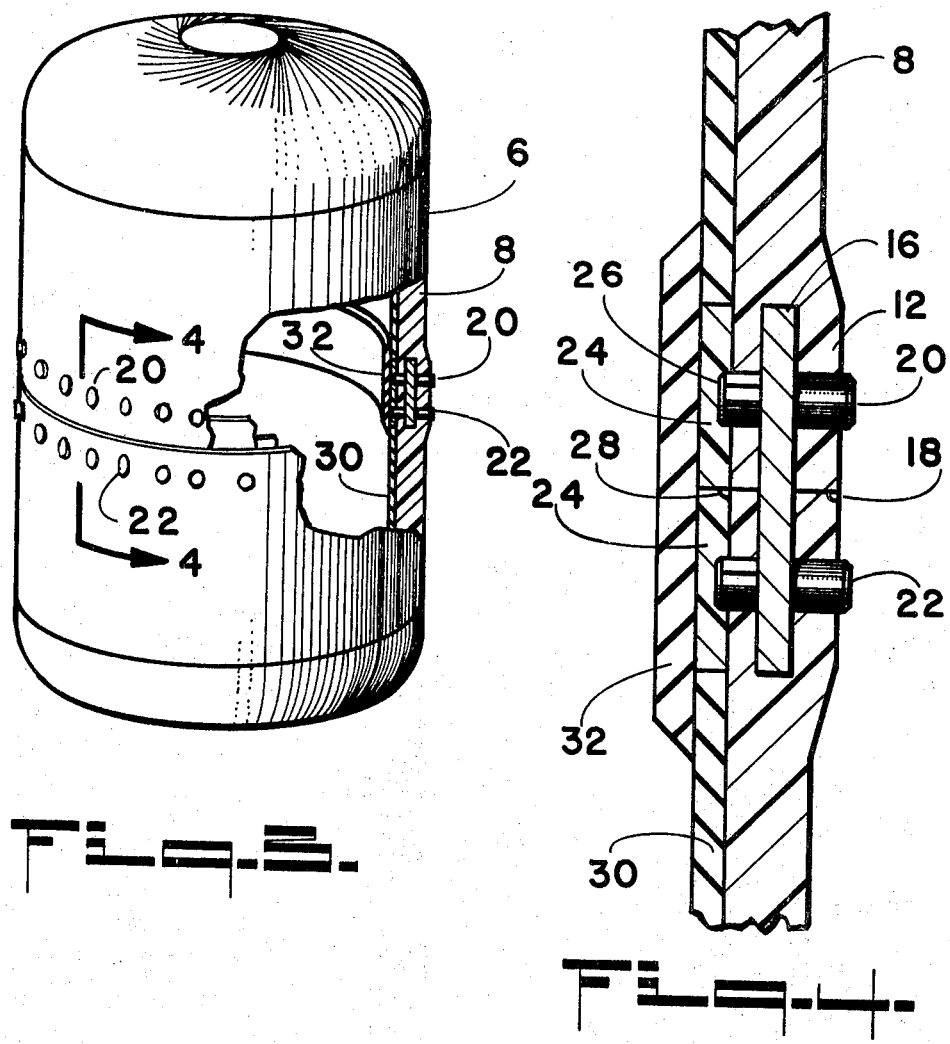

3,423,816
PROCESS OF MAKING A GLASS FIBER VESSEL HAVING A CLEVIS JOINT
James L. Grosh and Christian M. Frey, Los Altos, Calif., assignors to United Aircraft Corporation, a corporation of Delaware
Original application Feb. 21, 1962, Ser. No. 174,844, now Patent No. 3,357,594, dated Dec. 12, 1967. Divided and this application Oct. 12, 1966, Ser. No. 606,476
U.S. Cl. 29—416
Int. Cl. B23p *19/00;* B29d *23/00, 25/00*
2 Claims This application is a divisional application of application Ser. No. 174,844, filed Feb. 21, 1962, now Patent No. 3,357,594.

This invention relates to a method for providing joints in glass fiber pressure vessels. Glass fiber pressure vessels are used for a variety of purposes such as rocket motors, space vehicles, chemical reaction vessels and the like but at the present time the utility of large diameter filament-wound glass fiber pressure vessels is somewhat limited because of the inability to produce joints in such vessels capable of operating at internal pressures exceeding about 100 p.s.i. Satisfactory joints have been evolved for small vessels but joints for larger vessels, i.e., larger than 21 inches in diameter, have been incapable of resisting high pressures.

In accordance with the present invention, a method of making a simple joint is provided which is capable of resisting high pressures. Further, the joint is simple to make and normally does not involve any complicated machining operations.

It is therefore an object of the present invention to provide a method of making an effective clevis joint for glass fiber pressure vessels which joint is simple to construct, does not utilize complicated machining techniques or parts and which is simple to assemble.

Other objects will be apparent from the specification which follows.

In the drawings forming a part of this application:

FIGURE 1 is a perspective view, partially in section of a glass fiber vessel having an insert ring therein illustrating one method of fabricating the joint of the present invention.

FIGURE 2 is a sectional view on the lines 2—2 of FIGURE 1.

FIGURE 3 is a perspective view, partially in section of a pressure vessel having a joint embodying the present invention.

FIGURE 4 is a sectional view on lines 4—4 of FIGURE 3.

Referring now to the drawings by reference characters, FIGURES 1 and 2 illustrate preliminary stages in one method of fabricating the joint of the present invention. Here a glass fiber vessel 6 having a side wall 8 of substantially uniform cross section has been fabricated by the spiral winding of glass fibers coated with an epoxy resin over a removable mandrel. Such fabrication methods are well known to those skilled in the art. In this embodiment of the invention, a removable annular member 10 has been formed in place near the center of the wall and the wall itself has been thickened as at 12 to provide extra strength for the joint. The thus fabricated vessel is then sliced, cut or otherwise parted on the line 14 and the member 10 removed. Member 10 may be made of a material such as rubber which does not adhere to the glass fiber and after the vessel has been parted, the embedded portions of the member 10 may be pulled out leaving the two halves of the vessel, each of which has an annular U-shaped slot where the portion of the member 10 was removed. Other methods of construction can be employed such as the employment of a meltable or soluble member 10 which is melted or dissolved out of the wall after the parting cut has been made. Further, the device can be made without the use of the filler member 10 by providing a vessel with a thickened wall, and then milling slots in the abutting ends after the parting cut has been made.

To assemble the halves into the completed structure, member 16 is provided of a suitable material and of substantially the same thickness as the slot. The member 16 is preferably of metal although reinforced plastic may be used. The member 16 can be in the form of a continuous hoop or can be in the form of a series of links. If links are employed, they may be wide enough for a single pair of rivet holes or two or more pairs of holes may pass through the same links.

After inserting the reinforcing member or members 16, which hold the two halves in place, holes may be drilled or otherwise formed through the thickened portion 12 and through the member 16. These holes are drilled at substantially equal distances from the point of junction 18 of the two halves and sufficiently far back from the parting line as to provide a substantial thickness of material between the holes and the parting line. Suitable pins 20 and 22 are then passed through the drilled holes so that the member 16 is gripped by the pins forming a strong joint. The pins may be either cylindrical or tapered and may be provided with means for holding them in place. The holes may be threaded and bolts used instead of rivets. Ordinarily, the pins are made slightly undersized and forced into place so that they are held in place by friction.

If the method of construction is used in the formation of a rocket engine casing, some means must be employed on the side of the vessel to keep the joint relatively cool. In the embodiment shown in FIGURES 3 and 4 this is achieved by providing glass fiber rings 24 within the vessel which may be slightly recessed as at 26 to receive the ends of the pins. O-rings can be provided to make a gas tight seal. Insulation, as is common in the rocket engine art can be applied to the walls of a vessel as at 30 and over the joint as at 32.

The thickening of the joint shown at 12 is made by the use of metal foil or wire or ceramic filaments which are wound into the vessel or glass fabrics can be incorporated in the vessel as it is wound to provide additional strength.

Although the vessel has been described as being composed of two halves, it is obvious that several such joints might be used in a single structure. For instance, a central cylindrical section might be joined to two hemispherical end sections by this method.

It is believed apparent from the foregoing that we have provided a method of joining sections of a glass fiber pressure vessel which method is simple and effective.

We claim:

1. The process of making a glass fiber vessel having a clevis joint therein comprising forming a glass fiber vessel with an annular member embedded in the wall thereof, parting said vessel on a line intermediate of and substantially equidistance from the ends of the annular member, removing the thus severed parts of the annular member leaving two portions of the vessel with an annular slot in the ends of each of the portions, inserting a solid member in the slots and reassembling the vessel, forming holes through each of the vessel portions, said holes extending through the solid member, and inserting pins in said holes to hold the vessel together.

2. The process of claim 1 wherein the glass fiber vessel is formed with thickened walls adjacent said parting line.

References Cited

UNITED STATES PATENTS

| | | | |
|---|---|---|---|
| 9,737 | 5/1881 | Whittemore | 285—331 X |
| 1,446,274 | 2/1923 | Roberts | 220—80 |
| 2,751,109 | 6/1956 | Moore | 220—80 |
| 2,770,386 | 11/1956 | Mitchell et al. | 220—76 X |
| 3,012,315 | 12/1961 | Stillwagon | 29—423 |
| 3,039,649 | 6/1962 | Aleck | 220—80 |

CHARLIE T. MOON, *Primary Examiner.*

U.S. Cl. X.R.

29—423, 463, 526; 264—152